United States Patent
Stewart et al.

(10) Patent No.: US 9,426,410 B2
(45) Date of Patent: Aug. 23, 2016

(54) SECURE ONLINE ACCESS CONTROL FOR ACCESSING MEDIA CONTENT FROM DISCS

(75) Inventors: Russell Stewart, Los Angeles, CA (US); Timur Insepov, Sherman Oaks, CA (US)

(73) Assignee: SONY DADC US Inc., Terre Haute, IN (US)

( * ) Notice: Subject to any disclaimer, the term of this patent is extended or adjusted under 35 U.S.C. 154(b) by 1034 days.

(21) Appl. No.: 13/077,242

(22) Filed: Mar. 31, 2011

(65) Prior Publication Data

US 2012/0251076 A1   Oct. 4, 2012

(51) Int. Cl.
| H04N 9/80 | (2006.01) |
| H04N 5/913 | (2006.01) |
| H04N 5/85 | (2006.01) |
| H04N 9/82 | (2006.01) |

(52) U.S. Cl.
CPC ............... *H04N 5/913* (2013.01); *H04N 5/85* (2013.01); *H04N 9/8205* (2013.01)

(58) Field of Classification Search
CPC . H04N 21/2223; H04N 5/765; H04N 7/1675; H04N 21/25816; H04N 21/42669; H04N 21/4325; H04N 21/4367; H04N 21/4408
USPC .................. 386/248, 259, 253, 255; 709/227
See application file for complete search history.

(56) References Cited

U.S. PATENT DOCUMENTS

| 5,448,371 A * | 9/1995 | Choi .............................. 386/253 |
| 7,116,894 B1 * | 10/2006 | Chatterton ............. H04N 5/765 348/512 |
| 7,447,783 B2 * | 11/2008 | Kutaragi .......... G11B 20/00086 473/29 |
| 9,141,977 B2 * | 9/2015 | Davis ....................... G06Q 30/04 |
| 2002/0013940 A1 * | 1/2002 | Tsukamoto ............ H04N 7/163 725/5 |
| 2002/0112172 A1 * | 8/2002 | Simmons ................ G06F 21/10 713/193 |
| 2002/0147686 A1 * | 10/2002 | Safadi ..................... G06F 21/10 705/51 |
| 2005/0039032 A1 | 2/2005 | Babowicz et al. |
| 2006/0107283 A1 * | 5/2006 | Murphy ................. G06Q 30/02 725/25 |
| 2006/0277607 A1 | 12/2006 | Chung |
| 2008/0098118 A1 * | 4/2008 | Kutaragi et al. ............. 709/227 |
| 2010/0115026 A1 * | 5/2010 | Katata et al. ................. 709/203 |
| 2010/0246361 A1 | 9/2010 | Miazzo et al. |
| 2012/0251077 A1 * | 10/2012 | Stewart .................. H04N 5/913 386/253 |

FOREIGN PATENT DOCUMENTS

| JP | 2006073187 A | 3/2006 |
| WO | WO2005036812 A1 | 4/2005 |

* cited by examiner

*Primary Examiner* — Helen Shibru
(74) *Attorney, Agent, or Firm* — Trellis IP Law Group, PC (57) ABSTRACT

In one embodiment, a method of controlling distribution of content can include: sending authentication instructions from a server to a disc player having a disc inserted therein, where the disc includes media content without a plurality of files that are required by the disc player for playback of the media content; determining if the disc in the disc player is valid by comparing information received from the disc player against information stored in a database; receiving viewer verification information from the disc player to determine if the viewer is authorized to view the playback of the media content on the disc; sending an error indication if the disc is not valid and/or the viewer is not authorized; and sending the plurality of files that are required for the playback of the media content from the server to the disc player if the viewer is authorized and the disc is valid.

20 Claims, 6 Drawing Sheets

SECURE ONLINE ACCESS CONTROL FOR ACCESSING MEDIA CONTENT FROM DISCS

CROSS REFERENCE TO RELATED APPLICATIONS

The following commonly owned and co-pending United States Patent Application is related to the present application and is incorporated by reference herein in its entirety: U.S. patent application Ser. No. 13/077,263 entitled DISC UNLOCK CODE DISTRIBUTION CONTROL VIA REMOTE PHYSICAL ACTION AND LOCATION, by Russell Stewart et al., filed Mar. 31, 2011.

BACKGROUND

Protection of media content distribution is desirable, such as against unauthorized use or viewing of video in situations where unauthorized distribution may have a substantial impact on a title's revenue potential, or whenever a studio or content owner thinks a higher than normal set of security measures is required to protect video content. Specific examples suitable for controlled distribution include pre-release theatrical screeners distributed to the entertainment press and/or Oscar pre-theatrical release screeners that are sent out to the general membership of the Academy of Motion Picture Art and Sciences (AMPAS).

SUMMARY

Particular embodiments control distribution and playback of media content by distributing discs with the media content but without files that are required to playback that media content, and that must be obtained by other controlled and authenticated means.

In one embodiment, a method of controlling distribution of content can include: sending authentication instructions from a server to a disc player having a disc inserted therein, where the disc includes media content without a plurality of files that are required by the disc player for playback of the media content; determining if the disc in the disc player is valid by comparing information received from the disc player against information stored in a database; receiving viewer verification information from the disc player to determine if the viewer is authorized to view the playback of the media content on the disc; sending an error indication if the disc is not valid and/or the viewer is not authorized; and sending the plurality of files that are required for the playback of the media content from the server to the disc player if the viewer is authorized and the disc is valid.

In one embodiment, an apparatus having one or more processors, and logic encoded in one or more tangible media for execution by the one or more processors, when executed can be operable to perform such a method of controlling distribution of media content.

In one embodiment, a method of controlling playback of content, the method comprising: launching an authentication application for a disc in a disc player, where the disc includes media content without a plurality of files that are required by the disc player for playback of the media content; receiving a disc valid indication from a server to indicate if the disc in the disc player is valid; receiving an authorized viewer indication from the server to indicate if a viewer is authorized to view the playback of the media content on the disc; displaying an error indication in response to the disc valid indication and/or the authorized viewer indication being in a first state; downloading the plurality of files that are required for the playback of the media content from the server if both the disc valid indication and the authorized viewer indication are in a second state; and playing the media content on the disc player using the downloaded plurality of files.

In one embodiment, an apparatus having one or more processors, and logic encoded in one or more tangible media for execution by the one or more processors, when executed can be operable to perform such a method of controlling playback of media content.

A further understanding of the nature and the advantages of particular embodiments disclosed herein may be realized by reference of the remaining portions of the specification and the attached drawings.

DETAILED DESCRIPTION OF EMBODIMENTS

Particular embodiments are directed to secure playback of high definition, disc-based media content (e.g., video, audio, etc.). For example, authentication includes the download of required playback files as an additional layer of security. Thus, required playback files, or any files associated with playback (e.g., Java, playlists, etc.), for media content on a disc are stored in another location, with delivery of the files to a disc player only taking place once a series of authentication steps have been successfully completed. In addition, particular embodiments provide for multiple layers of security that can be selectively applied based upon a value of the media content on the disc.

For example, purposeful distribution of a disc that is outside of, e.g., the Blu-ray specification, is made whereby the download of playback control files may be required to interpret the video or other media content files on the disc. In this fashion, control of screener distribution and piracy prevention can be accommodated in particular embodiments.

Figure 1:
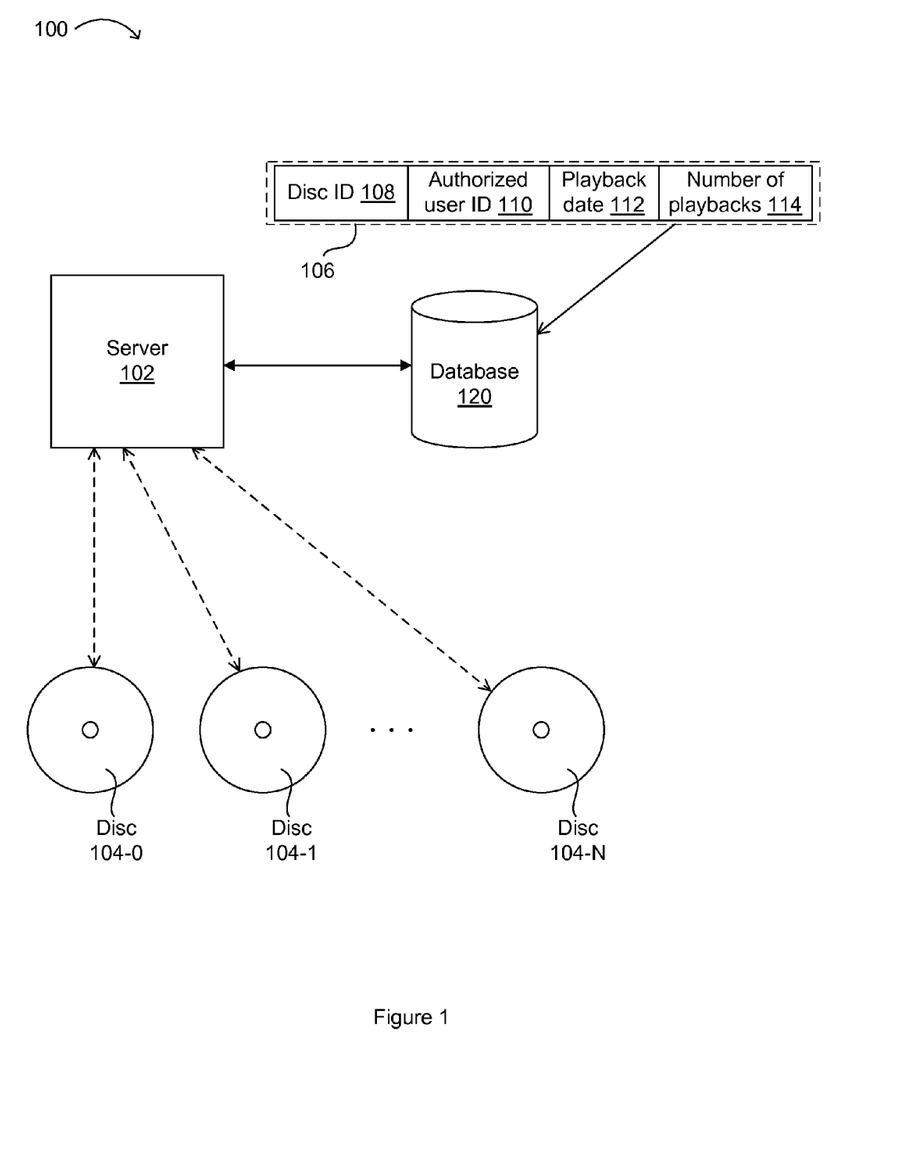
FIG. 1 depicts an example disc distribution and server control system.

Referring now to FIG. 1, shown is an example disc distribution and server control system 100. Any number of discs 104 (e.g., 104-0, 104-1, . . . 104-N) may be distributed, such as to a group of pre-release screeners. Each disc 104 may include media content to be screened or otherwise viewed, but files that are needed in order to playback the media content may not be found on disc 104. Server 102 can essentially track distributed discs 104 by use of entries 106. For example, entries 106 may be in a database 120 that is either separate from (as shown), or included within server 102.

Each entry 106 can include various information used to validate or authenticate a disc 104 and/or a user or viewer of the media content on the disc 104. For example, each entry 106 can include disc identifier 108, authorized user identifier 110, playback date 112, and a number of playbacks allowed 114. Any other suitable playback permissions and/or restriction parameters can be stored in entry 106 of database 120, such as other unique identifiers, geographic region restrictions, a number of authorized machines, a duration of authorization, an account termination date, to name only a few.

Suitable copy protection and authenticity mechanisms, such as a burst cutting area (BCA) that can be utilized for disc identification and/or validation purposes. BCA can refer to the circular area near the center of a DVD, HD DVD or Blu-ray disc, where a barcode can be written for additional information such as ID codes, manufacturing information, and serial numbers. BCA locations can also vary from a location near the disc hub, such as in a Blu-ray disc. The BCA can be written, e.g., using a laser to "cut" the identifier into the aluminum reflective layer of the finished disc, thus adding a unique identifier to each manufactured disc.

Thus for example, BCA can be used to encode a unique serial number post pressing in the manufacturing process of each disc 104. Discs as they come off a manufacturing line may also be entered into database 120 and tracked through the supply chain. For example, 10,000 discs may be designated as "screener" discs which are treated a certain way, and the next 100,000 discs off the line may be designated as "Best Buy" discs and are treated in a different way. BCA capture can be pushed or otherwise tracked in one or more databases 120 in a centralized fashion, such as in association with centralized server 102. In this fashion, many retail applications, in addition to disc distribution control, may benefit from knowledge as to where a particular disc 104 was sold or otherwise acquired.

In addition, transportation security for each disc 104 can be accommodated by shipping the discs with a "lock" that disallows playbacks regardless of any other factors until release of that lock, which may occur as a result of electronic confirmation of a signature indicating receipt of the disc at a delivery location. Such shipping confirmation and subsequent unlocking can then enable other disc validation and viewer authentication mechanisms as described herein.

Particular embodiments thus involve purposeful distribution of a disc that is outside, or a subset, of a standard (e.g., Blu-ray) specification, and where some content control or access files are withheld from the disc, but provided in an online nature. Thus, existing disc specifications can be utilized in a way to distribute media content to screeners with that content only being accessible by viewer after an authentication process. In this fashion, particular embodiments involve a digital rights management (DRM) aspect along with a copy control aspect to control media content distribution.

Other approaches may instead download all content once authenticated, as opposed to having some content, such as files required for playback of the media content, withheld. Some approaches also employ video on demand (VOD) technologies, but utilize a disc as an authentication mechanism. In contrast, particular embodiments are directed to sending out a disc that is not configured to be played back, or "ripped" in and of itself, but instead requires authentication steps that are performed online, as well as a "heartbeat" connection, in order to playback the media content from the disc at all. Thus, such a connection heartbeat may not be for delivery of actual media content, but rather to make sure someone cannot access that media content without authorization.

Figure 2:
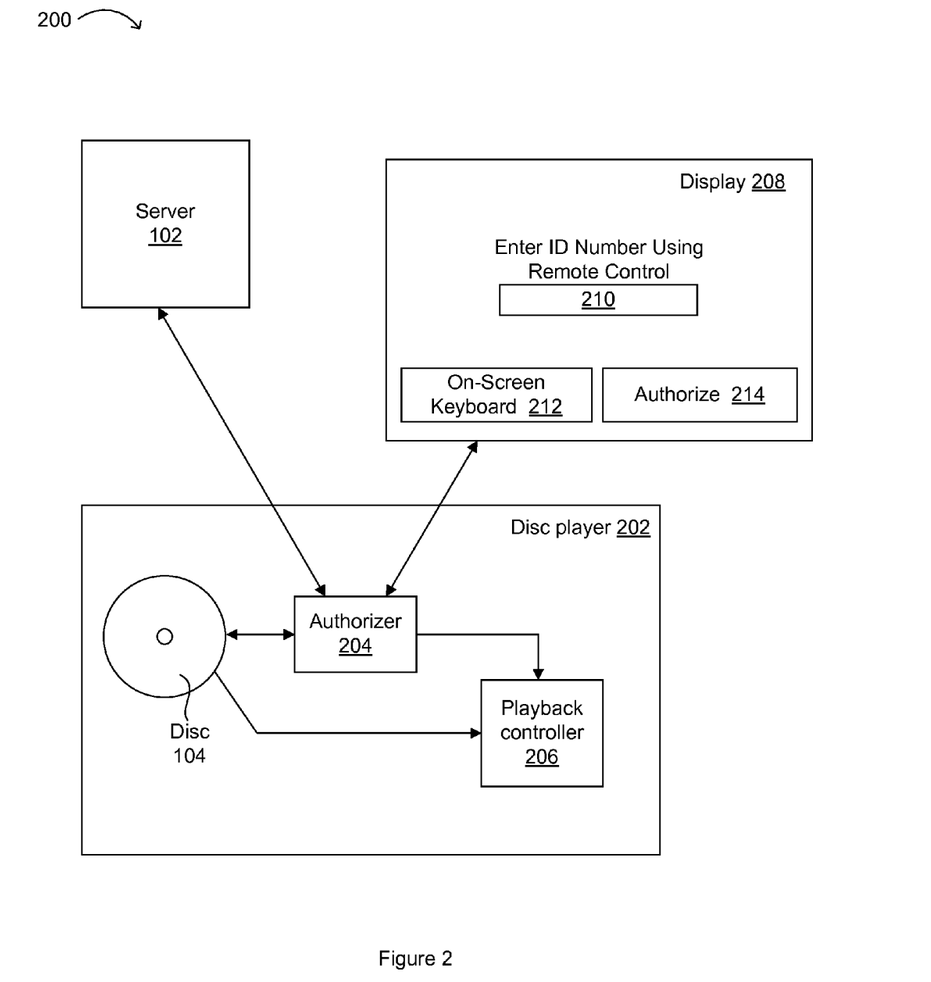
FIG. 2 depicts an example disc player and user interface arrangement.

In addition, server 102 may deliver a single channel of uniquely watermarked audio to tag each playback session. Any pirated copy carrying the watermark can be traced to a single playback session, thus allowing identification of the user, specific playback device, and date/time the copy was made. Further, session-specific visible watermarks can be displayed on a display screen 208 during playback of the media content. Also, heartbeat signals may be sent by disc player 202 to server 102 by using code found on disc 104 that is activated during playback. For example, if disc 104 and/or disc player 202 does not receive confirmation that the heartbeat signal has been received by server 102, the server may terminate the playback session and delete files that were downloaded to disc player 202 in order to playback the media content.

Accordingly, a shipping disc may not include required information needed by disc players and ripping software in order to interpret the media content (e.g., video data) in a viewable or playable format. Particular embodiments may be used as a method of authentication for video content that is sent to consumers in situations where Internet connectivity is available as an interface to the disc player. Particular embodiments may be used during the production process for the delivery of early screeners or dailies, such as raw, unedited footage shot during the making of a motion picture.

For example, a disc 104 (e.g., a Blu-ray disc (BD), digital video disc (DVD), etc.) can be authored in a manner that requires the download of specific files or data structures/instructions from the Internet (e.g., via server 102) before playback of the disc is able to commence. Specifically, the files (or directories) required for the display of the menu system, playlists to ensure the proper order of movie clips, and other files required for playback, may not be on the disc that the user receives.

Referring now to FIG. 2, shown is an example disc player and user interface arrangement 200. When a disc 104 is inserted in disc player 202 for playback, instructions and/or files that are used by disc player 202 to control this playback may not be found on disc 104. Disc player 202 can be any suitable type of player (e.g., DVD, BD-Live, Blu-ray, etc.) for playing disc 104. Thus for example, while video that a user would like to view is already on disc 104, because instructions (e.g., what video data to play, etc.) that are needed by disc player 202 in order to play that video data may not be, disc player 202 may interface with server 102 in order to obtain these critical files.

Because instructions may be removed from disc 104 in certain embodiments, the display 208 may instead display an error message without connections/authorization via server 102. In this fashion, the disc 104 that is produced cannot be played by disc player 202 in a standalone disc player 202 environment, but rather can playback the media content on the disc if suitable authorizations and connections are made via server 102. The media content (e.g., video) is thus inert without the Java code or other suitable instructions and/or files on the disc for reading by disc player 202.

Disc 104 inserted in disc player 202 can be authorized using authorizer 204. For example, authorizer 204 can interface with server 102 in order to determine if disc 104 is valid and/or a viewer of the media content on the disc is authenticated. Playback controller 206 can thus receive indications from authorizer 204 as to whether disc 104 can be played back. As part of this process, the necessary instructions and/or files not initially found on disc 104 can be downloaded via server 102. Such files may be stored in a memory on or associated with disc player 202 and/or may be written to or burned on disc 104. Depending on particular security settings, such downloaded playback file information can be stored in different fashions. For maximum security, only temporary storage within disc player 202 can be accommodated. For reduced security, or for faster subsequent authentications, local storage in disc player 202 can hold the downloaded playback file information for longer periods of time.

In the example display 208, an entry 210 can be used to enter an identification number using a remote control for disc player 202. On-screen keyboard 212 is another option for entering information, and authorize 214 can be selected when the user is ready to send information and have server 102 attempt authorization. Before this particular screen may be shown on display 208, database 120 associated with (or included within) server 102 may be performed a check of disc player 202 (e.g., Internet protocol (IP) address, geographic location, etc.) against a predetermined list in the database. An identifier for disc 104 can then be entered (e.g., via entry 210) so that database 120 can confirm delivery of the disc against the IP address of disc player 202, or another suitable identifier of the viewer or user of disc player 202, versus an intended delivery address for disc 104.

Server 102 may be used to control access to disc playback using a wide variety of parameters, and such may be stored in associated database 120. For example, a number of playback sessions allowable for disc 104 can be controlled based on awareness by server 102. Further, server 102 may be made aware of potential compromised disc accessed, e.g., by watching patterns of requests for data. For example, when used in the screener realm, a hacker or a repeated number of requests with a same disc number might indicate compromised access to the particular disc 104. Server 102 or a backend can then only allow a disc to be played back after suitable authentication. In this fashion, backend or server 102 may always be on standby waiting for an appropriate trigger mechanism in order to determine authentication.

Figure 3:
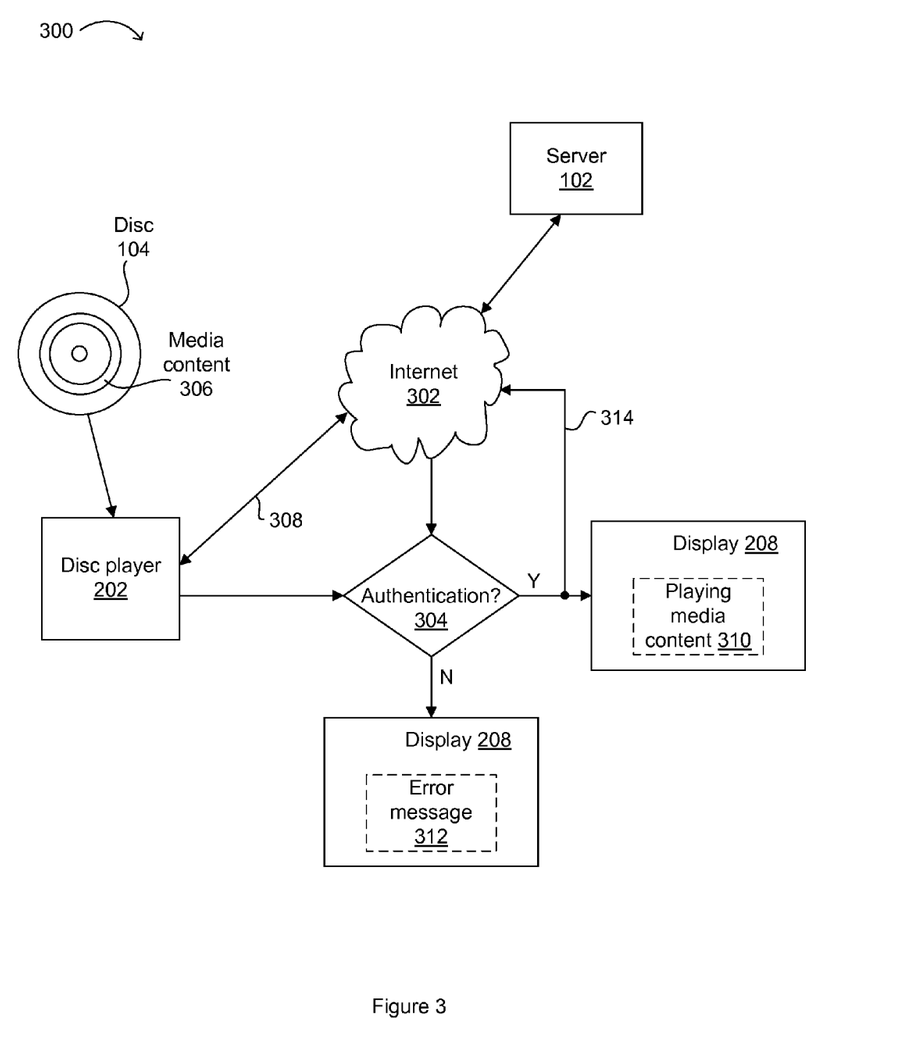
FIG. 3 depicts an example authentication flow to view media content.

Referring now to FIG. 3, shown is an example authentication flow 300 to view media content. Disc 104 may be inserted into disc player 202 for playback of media content 306. However, because disc 104 may not include files that are needed by disc player 202 in order to playback media content 306, an authentication 304 can be performed via Internet 302 or any other network providing access to server 102. If disc 104 is determined to be invalid and/or a viewer using disc player 202 is otherwise not authenticated, display 208 may display an error message 312.

However, if both of disc 104 is determined to be valid and the viewer using disc player 202 is authenticated (304), display 208 can playback the media content (310). In order for disc player 202 to playback media content 306, various non-disc-based files or data can be downloaded from server 102 via the Internet 302. Thus if authentication (304) occurs, indication 314 can be sent via the Internet 302 to server 102. Server 102 can then provide the necessary files to display 208 or disc player 202 via 308.

In particular embodiments, various files that are required for playback of media content 306 may be left off from disc 104. Only authenticated users having valid discs 104 may be allowed to download these files required for playback from server 102. Examples of such non-disc based data or files required for playback of Blu-ray discs may include "BDefense" playlists (BDefense is a product of Sony DADC), Java to enable playback, descriptor files, Clpi files, Mpls files, an index.bdmv file, a MovieObject.bdmv file, and/or entire directories that might otherwise be found under, e.g., the Blue-Ray Movie (BDMV) directory. Other disc formats (e.g., DVD, HD DVD, etc.) can also be supported in particular embodiments, with associated other suitable files required by corresponding players for playback being excluded from disc 104.

Figure 4:
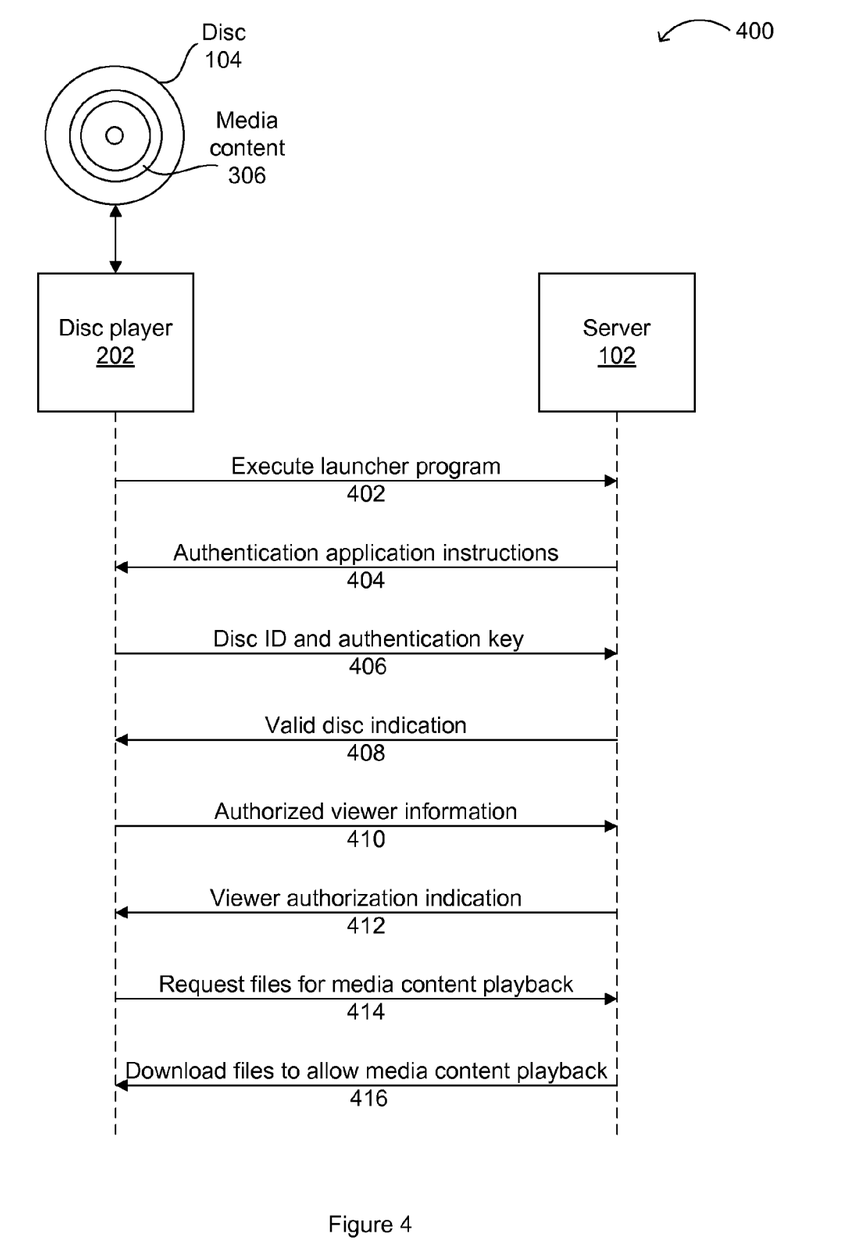
FIG. 4 depicts an example of disc player and server interaction to control playback of media content.

Referring now to FIG. 4, shown is an example of disc player and server interaction 400 to control playback of media content. In order to playback media content 306, various files may be downloaded from server 102 to disc player 202. Such downloading may be gated by an application that resides on disc 104. To download the files required for playback of media content 306, disc player 202 may first execute a launcher or bootstrap program (402) that may request a next step from server 102. In some embodiments, other files on disc 104 may be kept to a minimum, such that a main portion of disc 104 can be occupied by various media content 306 (e.g., high definition movie files). The launcher program may be executed (402) in response to disc player 202 attempting to playback media content 306 from disc 104.

Server 102 may access a manifest online to ensure that certain versions of the authentication application are found on disc 104 and/or in disc player 202, and if not server 102 may download new code to disc player 202 as part of authentication application instructions 404. In certain embodiments, the authentication application may represent the only executable code found on disc 104 as shipped. For example, server 102 may instruct disc player 202 to use an existing Blu-ray disc (BD)-Java authentication application that was present on disc 104 when shipped. Alternatively, if any compromise is suspected (e.g., via monitoring for unusual data patterns), server 102 may instruct disc player 202 to download a new authentication application. For example, a new downloaded authentication application (e.g., an updated version) may be written to disc 104 to replace the version that came on the disc. Alternatively, disc player 202 may store the updated authentication application version in other memory therein. In any event, server 102 may track a current state of authentication applications along with associated valid or not valid states thereof. In this fashion, server 102 can essentially track each disc copy versus authentication application.

Once disc player 202 has downloaded (or is instructed to execute the current) authentication application, a key exchange may performed to verify that disc 104 is valid. For example, disc player 202 may send a disc identifier and/or authentication key (406) to server 102. In one particular example, the validation is performed using a unique serial number (e.g., BCA) that is imprinted on disc 104 during the replication process. The validation can also be accomplished via an authentication key exchange and verification process between the application executing on disc player 202 and server 102. In response, server 102 may send a valid disc indication 408 to disc player 202.

If disc 104 is found to be valid by server 102, a screen can be displayed in association with disc player 202 to provide instructions for the user to enter additional information to prove that they are an authorized viewer of media content 306 on disc 104. In response, the viewer can enter authorized viewing information 410 for sending to server 102. Server 102 may then provide an indication 412 as to whether this viewer is authorized to view media content 306 using disc player 202. If so authorized and the disc is determined to be valid, disc player 202 may request files for media content playback (414) from server 102. In response, server 102 may provide these files for download (416) to allow media content 306 to be played back on disc player 202.

Figure 5:
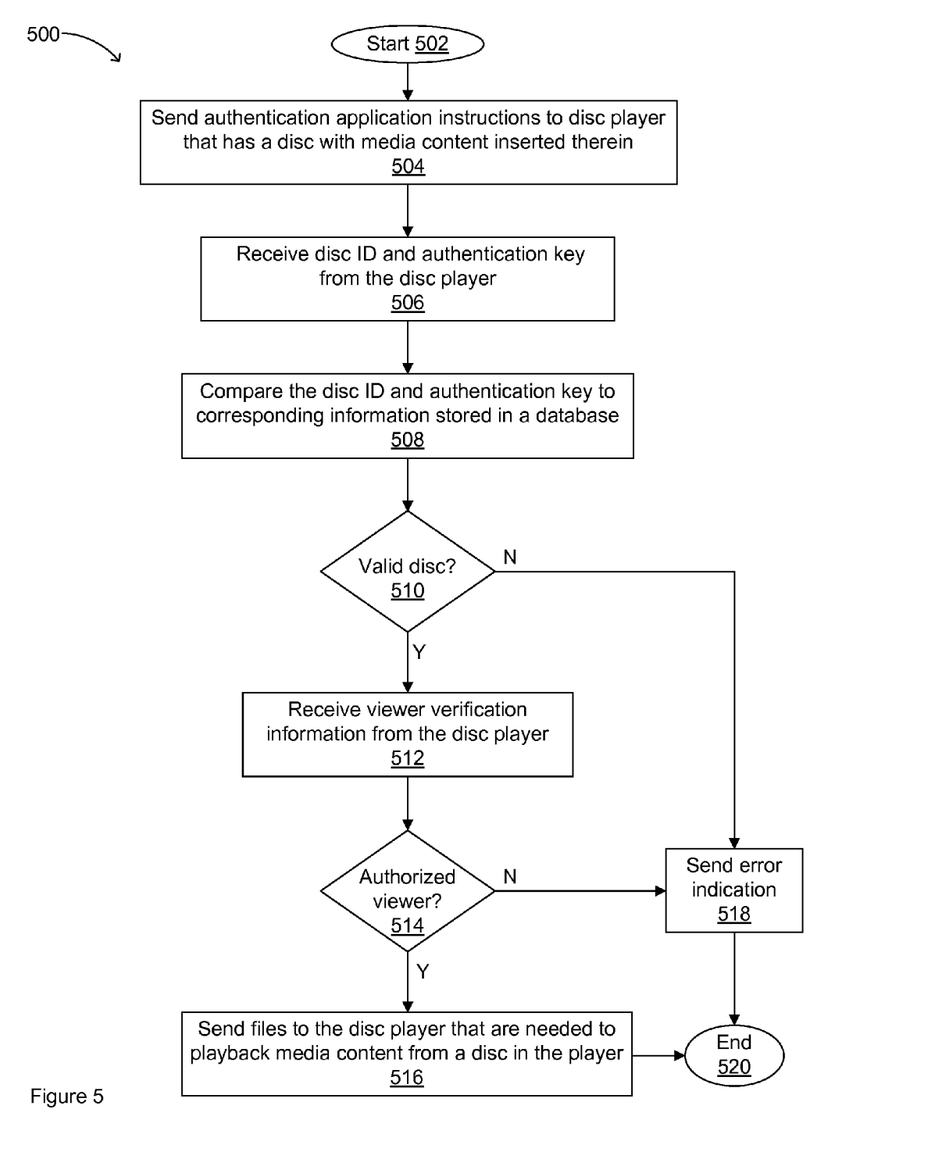
FIG. 5 is a flow diagram of an example method of a server controlling distribution of media content.

Referring now to FIG. 5, shown is a flow diagram of an example method 500 of a server controlling distribution of media content. The flow begins (502) with the disc being inserted into a disc player. Authentication instructions may then be sent from a server to a disc player having the disc inserted therein (504). The disc can include media content without a plurality of files that are required by the disc player for playback of the media content. A server may receive disc identification and/or authentication key information from the disc player (506). This information can be used to determine if the disc in the disc player is valid by comparing information received from the disc player against information stored in a database (508).

If the disc is determined by the server to be invalid (510), an error indication can be sent to the disc player (518), or otherwise indicated to the user of the disc player, completing the flow (520). If the disc is determined by the server to be valid (510), the server may receive viewer verification information from the disc player (512) to determine if the viewer is authorized to view the playback of the media content on the disc. If the viewer is determined by the server to be unauthorized (514), an error indication can be sent to the disc player (518), or otherwise indicated to the user of the disc player, completing the flow (520).

However, if the viewer is determined by the server to be authorized (514), and the disc has previously been determined to be valid (510), the plurality of files that are required for the playback of the media content may be sent from the server to the disc player (516), thus completing the flow (520). Thus, an error indication may be sent or otherwise provided to the user of the disc player if the disc is determined to be invalid and/or the viewer is determined to be unauthorized.

There are several situations that may cause a disc player to refuse any further user interaction. For example, such situations may result in the disc player displaying an error page to the user, along with instructions for requesting playback. For example, a disc player may refuse playback if "online" database 120 associated with server 102 for verification of the disc returns that the date for last playback has passed. This information regarding the playback date can be stored in a database entry, such as playback date 112 in entry 106, as discussed above with reference to FIG. 1. In certain embodiments, playback date may be set by the disc manufacturer, the media content owner, or by the customer, and can be changed for any set of serial numbers by updating the online database 120.

Another example whereby a disc player may refuse playback is where the online database 120 associated with server 102 for disc verification determines that the disc identifier (e.g., BCA number) returned by the disc is not valid. In such a case, the disc identifier received from the disc player may not match any corresponding number stored in a database entry, such as disc ID 108 in entry 106. Another example is where the key exchange process might not complete or might otherwise indicate some form of tampering.

Another example whereby a disc player may refuse playback is where the online database 120 associated with server 102 for disc verification determines that the disc may have been set to only playback once, and that playback session has already taken place. For example, each requested playback for a certain disc identified by the disc identifier can be compared against a corresponding number stored in a database entry, such as number of playbacks 114 in entry 106. Thus, if the number of requested playbacks for a given disc exceeds the stored number of playbacks 114, the disc may be indicated as invalid, and playback accordingly refused by disc player 202.

If online database 120 returns to the disc player (via server 102) that the disc identifier (e.g., BCA) is valid and the key exchange process completes without error, the user interaction portion of validation commences. In this portion, the user may be asked to enter an external (e.g., off-disc, off-line, etc.) piece of information to verify that the user is the intended recipient of the disc. For example, such user verification information can include a number, a piece of text, a combination of text and numbers (alphanumeric characters), as well as speech recognition for voiceprint or voice characteristic analysis and matching, biometric matching, fingerprint matching, or any other suitable way of identifying a particular user.

In one Oscar screener application example, the recipient's AMPAS identification number can be provided as this second piece of authentication information. These numbers can be married with the disc identifier or BCA number prior to the shipment of the disc to provide a one-to-one relationship between a specific disc and a corresponding external validation code.

In one example, such a relationship can only be altered on the database 120 and/or server 102 itself, and a shipping disc may not be aware of the concept of the off-disc code being required for playback. Once again, if the correct information is not entered, or if multiple incorrect entries are made, the disc may refuse to proceed to the next step. If the disc validation and viewer authentication favorably complete, the disc player may be given a download list indicating the files required for playback. Download of the off-disc files may then commence, and the disc virtual file system (VFS) can be updated once all files are present on the disc and/or disc player.

Figure 6:
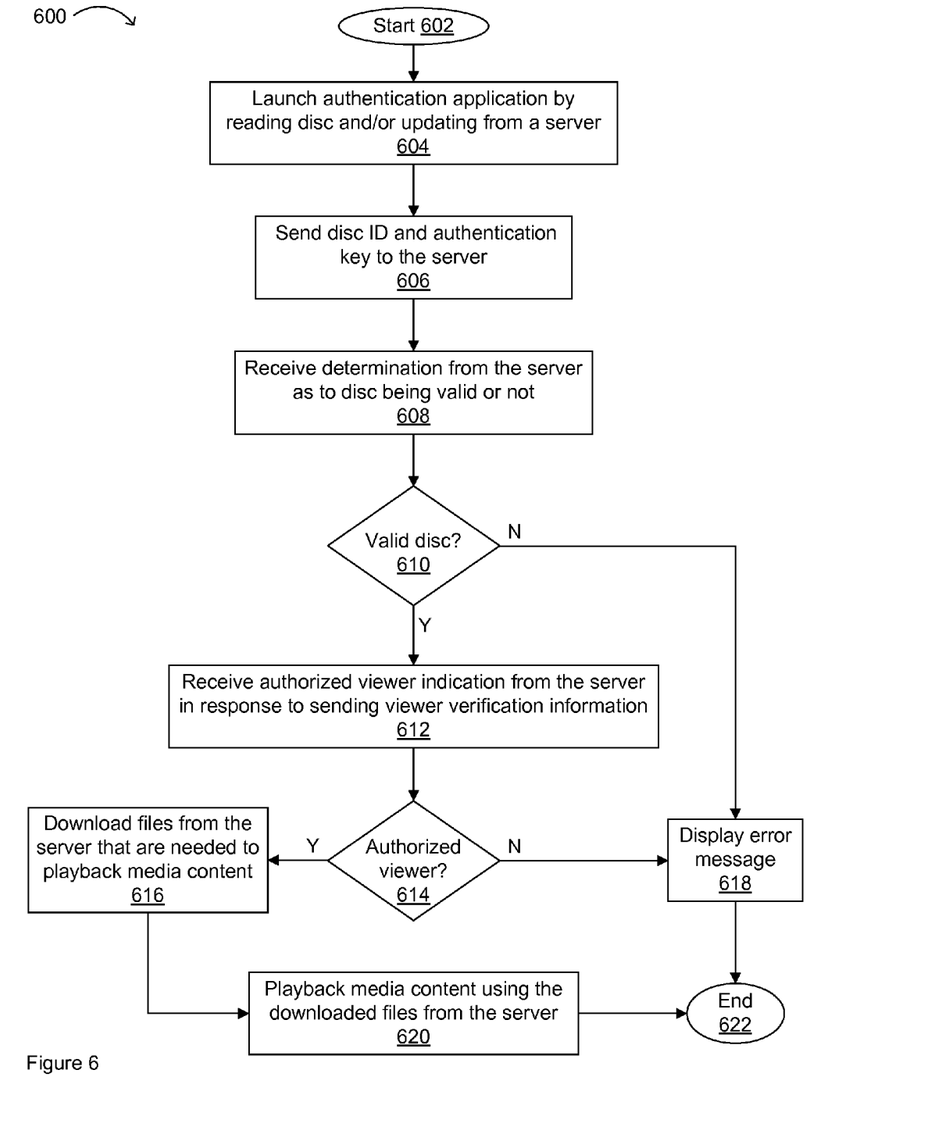
FIG. 6 is a flow diagram of an example method of a disc player controlling playback of media content.

Referring now to FIG. 6, shown is a flow diagram of an example method 600 of a disc player controlling playback of media content. The flow begins (602), an authentication application can be launched by reading the disc and/or updating the authentication application from a server (604). The disc may include media content without a plurality of files that are required by the disc player for playback of the media content. Disc identifier and/or authentication keys may be sent from the disc player to the server (606). In response, a disc valid indication may be received from a server to indicate if the disc in the disc player is valid (608).

If the disc is determined by the server to be invalid (610), an error message may be displayed (618), completing the flow (622). For example, the error message may be displayed on a display screen that is associated with the disc player. If the disc is determined by the server to be valid (610), an authorized viewer indication may be received from the server to indicate if a viewer is authorized to view the playback of the media content on the disc (612). If the viewer is not authorized (614) and/or the disc is determined to be invalid (610), an error indication can be displayed on a display screen associated with the disc player (618), thus completing the flow (622).

However, the disc valid indication (610) and the authorized viewer indication (614) both indicate that the disc is valid and the viewer is authorized to view the media content on the disc, the plurality of files that are required for the playback of the media content may be downloaded from the server (616). Once these files have been downloaded to the disc player and/or written to the disc, the VFS may be updated accordingly. The media content may then be played back on the disc player using the downloaded plurality of files (620), completing the flow (622).

After the file system (e.g., VFS) update is complete, a disc playback interface may be presented to the user to facilitate commencement of playback. However, particular embodiments may also include a "heartbeat" application downloaded as part of the online files to check for continued Internet connectivity. For example, playback may be halted if this heartbeat application determines that connectivity is interrupted during playback. In such a case, the user may be sent to an error message page with instructions for resuming playback. For example, interrupted playback may only take place if the Internet connection has been absent for "x" or a predetermined number of seconds, with the variable "x" being stored on the server, or in database 120 associated therewith, and downloaded as part of the initial playback instructions.

Once playback of the media content from the disc is finished, the user may be returned to a menu initially used to begin playback, or to any other suitable menu or instruction conveying interface. In some cases, the viewer may playback the media content or movie multiple times without re-authentication, but the disc may check in with the online database 120 (e.g., via server 102) to determine eligibility for playback on each new playback attempt of the media content. As such, Internet connectivity may be maintained throughout the multiple playbacks of the media content in a same viewing session. Also for example, the length of time that the viewing session can last is also set as a variable on the server 102 and/or database 120 (e.g., via entry 106).

If the disc is ejected in a proper manner (as opposed to a "crash" exit where the user hits the eject button during playback), all files related to the disc in the VFS may be purged and a user must start over the next time of the media content is requested playback. If the disc is ejected before file system clean-up can be accomplished, a unique session identifier code, which may be generated as part of the original request for playback, may be used to ensure that any additional sessions are not capable of using the existing VFS files for playback. Further, layered security and DRM measures may be introduced on top of the authentication and copy protection mechanisms described herein.

An alternative authentication approach supported in particular embodiments involves registration of a disc player instead of verifying a disc and authenticating a viewer. In this particular example, disc player 202 may be registered via server 102, and issued an identifier that is stored in database 120. The identifier may be based on unique data encoded on the hardware of disc player 202. For example, when a viewer receives disc 104 (e.g., a screener disc), the viewer may enter a predetermined authorization code. As long as conditions the same, subsequent discs received by the same user for playback on the same disc player can proceed without other interaction. In this fashion, authentication mechanisms may be substantially transparent to the user once a particular disc player or machine is registered. Further, with this approach, a particular disc player may be the only player in which a given viewer may play such screener discs.

Additional layers of protection supported in particular embodiments include Java code that is delivered to the disc player only being able to execute for that specific playback session. Removal of the disc, loss of power to the disc player, or attempts to directly access the file system can result in session termination and purging of the downloaded files. Other specific playback restrictions applied on a title or studio basis can include only allowing playback on certain operating system (OS) versions on given disc player or other playback types of machines (e.g., PS3, etc.).Disc players may also be controlled on the basis of media access control (MAC) IDs, IP addresses (e.g., predetermined address ranges) or any other suitable disc player identifiers.

Although the description has been described with respect to particular embodiments thereof, these particular embodiments are merely illustrative, and not restrictive. For example, while discs and disc players have been described herein, other types of physical distribution-based mediums can be employed in particular embodiments. In addition, while a server coupled to the disc player via the Internet is described herein, the server or other computing devices may be coupled to the disc or other type of player via any suitable network (e.g., a virtual private network (VPN), etc.).

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method of controlling distribution of content to a viewer, the method comprising:
   sending authentication instructions from a server to a disc player having a disc inserted therein, wherein the disc comprises media content without a plurality of files that are required by the disc player for playback of the media content;
   determining if the disc in the disc player is valid by comparing information received from the disc player against information stored in a database;
   receiving viewer verification information from the disc player to determine if the viewer is authorized to view the playback of the media content on the disc;
   sending an error indication if the disc is determined to be invalid and/or the viewer is determined to be unauthorized; and
   sending the plurality of files that are required for the playback of the media content from the server to the disc player if the viewer is authorized and the disc is valid.

2. The method of claim 1, further comprising:
   distributing a plurality of discs, the disc being one of the plurality of discs, wherein each of the plurality of discs comprises the media content without the plurality of files that are required for playback of the media content.

3. The method of claim 1, wherein the determining if the disc is valid comprises comparing an authentication key sent from the disc player against a corresponding key from the database.

4. The method of claim 1, wherein the receiving the viewer verification information occurs only if the disc is valid.

5. The method of claim 1, further comprising:
   maintaining an Internet connection between the disc player and the server for a duration of the playback of the media content.

6. The method of claim 1, wherein the determining if the disc is valid comprises comparing a disc identifier for the disc against corresponding information from the database.

7. The method of claim 1, wherein the determining if the disc is valid comprises checking a number of playbacks allocated for the disc and determining if the number of playbacks has been exceeded.

8. The method of claim 1, wherein the determining if the disc is valid comprises comparing a date by which playbacks for the disc are allowed to occur against a current date.

9. An apparatus, comprising:
   one or more processors; and
   logic encoded in one or more tangible media for execution by the one or more processors, and when executed being operable to:
      send authentication instructions to a disc player having a disc inserted therein, wherein the disc comprises media content without a plurality of files that are required by the disc player for playback of the media content;
      determine if the disc in the disc player is valid by comparing information received from the disc player against information stored in a database;
      receive viewer verification information from the disc player to determine if a viewer is authorized to view the playback of the media content on the disc;
      send an error indication if the disc is determined to be invalid and/or the viewer is determined to be unauthorized; and
      send the plurality of files that are required for the playback of the media content to the disc player if the viewer is authorized and the disc is valid.

10. The apparatus of claim 9, wherein the logic when executed that is operable to determine if the disc is valid comprises logic when executed that is operable to compare an authentication key sent from the disc player against a corresponding key from the database.

11. The apparatus of claim 9, further comprising logic when executed that is operable to:
    maintain an Internet connection between the disc player and the server for a duration of the playback of the media content.

12. The apparatus of claim 9, wherein the logic when executed that is operable to determine if the disc is valid comprises logic when executed that is operable to compare a disc identifier for the disc against corresponding information from the database.

13. The apparatus of claim 9, wherein the logic when executed that is operable to determine if the disc is valid comprises logic when executed that is operable to check a number of playbacks allocated for the disc and determine if the number of playbacks has been exceeded.

14. The apparatus of claim 9, wherein the logic when executed that is operable to determine if the disc is valid comprises logic when executed that is operable to compare a date by which playbacks for the disc are allowed to occur against a current date.

15. A method of controlling playback of content, the method comprising:
    launching an authentication application for a disc in a disc player, wherein the disc comprises media content without a plurality of files that are required by the disc player for playback of the media content;
    receiving a disc valid indication from a server to indicate if the disc in the disc player is valid;
    receiving an authorized viewer indication from the server to indicate if a viewer is authorized to view the playback of the media content on the disc;
    displaying an error indication in response to the disc valid indication and/or the authorized viewer indication being in a first state;
    downloading the plurality of files that are required for the playback of the media content from the server if both the disc valid indication and the authorized viewer indication are in a second state; and
    playing the media content on the disc player using the downloaded plurality of files.

16. The method of claim 15, wherein the launching the authentication application comprises:
    reading the disc inserted in the disc player; and
    updating the authentication application from the server if the server indicates that the authentication application is out of date.

17. The method of claim 15, further comprising:
    maintaining an Internet connection between the disc player and the server for a duration of the playback of the media content.

18. An apparatus, comprising:
    one or more processors; and
    logic encoded in one or more tangible media for execution by the one or more processors, and when executed being operable to:
       launch an authentication application for a disc in a disc player, wherein the disc comprises media content without a plurality of files that are required by the disc player for playback of the media content;

receive a disc valid indication from a server to indicate if the disc in the disc player is valid;

receive an authorized viewer indication from the server to indicate if a viewer is authorized to view the playback of the media content on the disc;

display an error indication in response to the disc valid indication and/or the authorized viewer indication being in a first state;

download the plurality of files that are required for the playback of the media content from the server if both the disc valid indication and the authorized viewer indication are in a second state; and play the media content on the disc player using the downloaded plurality of files.

19. The apparatus of claim 18, wherein the logic when executed that is operable to launch the authentication application comprises logic when executed that is operable to:

read the disc inserted in the disc player; and update the authentication application from the server if the server indicates that the authentication application is out of date.

20. The apparatus of claim 18, further comprising:

logic when executed that is operable to maintain an Internet connection between the disc player and the server for a duration of the playback of the media content.

* * * * *